(12) United States Patent
Carney et al.

(10) Patent No.: US 7,377,237 B2
(45) Date of Patent: May 27, 2008

(54) COOLING SYSTEM FOR HYBRID POWER SYSTEM

(75) Inventors: Allen B. Carney, Vadnain Heights, MN (US); John C. Hughes, Andover, MN (US); Kevin J. Keene, Coon Rapids, MN (US); Deborah A. Klinkert, Plymouth, MN (US); Bradley D. Padget, Richfield, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 11/520,260

(22) Filed: Sep. 13, 2006

(65) Prior Publication Data

US 2008/0060589 A1 Mar. 13, 2008

(51) Int. Cl.
*F01P 1/06* (2006.01)

(52) U.S. Cl. .............. 123/41.31; 123/41.12; 123/41.49

(58) Field of Classification Search .......... 123/41.31, 123/41.49, 41.12, 142.5 E, 41.33, 41.34
See application file for complete search history.

(56) References Cited

U.S. PATENT DOCUMENTS

| | | | |
|---|---|---|---|
| 4,352,342 A | 10/1982 | Cser et al. | |
| 4,510,893 A | 4/1985 | Schweiger et al. | |
| 4,677,943 A | 7/1987 | Skinner | |
| 4,739,730 A | 4/1988 | Jenz et al. | |
| 4,765,284 A * | 8/1988 | Kanazawa et al. | 123/41.49 |
| 5,111,776 A | 5/1992 | Matsushiro et al. | |
| 5,163,506 A | 11/1992 | Attinger et al. | |
| 5,241,926 A | 9/1993 | Sato et al. | |
| 5,255,636 A | 10/1993 | Evans | |
| 5,433,175 A | 7/1995 | Hughes et al. | |
| 5,563,802 A | 10/1996 | Plahn et al. | |
| 5,680,833 A | 10/1997 | Smith | |
| 6,276,312 B1 | 8/2001 | Summan et al. | |
| 6,467,286 B2 | 10/2002 | Hasebe et al. | |
| 6,616,059 B2 | 9/2003 | Sabhapathy et al. | |

(Continued)

FOREIGN PATENT DOCUMENTS

JP 2004-82921 3/2004

OTHER PUBLICATIONS

Co-pending U.S. Appl. No. 11/520,464.

(Continued)

*Primary Examiner*—Stephen K. Cronin
*Assistant Examiner*—Hyder Ali
(74) *Attorney, Agent, or Firm*—Hamre, Schumann, Mueller & Larson, P.C.; J. Bruce Schelkopf

(57) ABSTRACT

A cooling system for a hybrid power system that includes an engine employs an engine cooling circuit to deliver coolant to the engine, the engine cooling circuit including a radiator and a main fan to draw air through the radiator. When the hybrid power system further includes an inverter, then the inverter is cooled via an inverter cooling circuit that is formulated as one portion of the cooling system to deliver coolant to the inverter, the inverter cooling circuit including a heat exchanger located such that the main fan draws air through the heat exchanger when the main fan is active. The cooling system also includes a secondary fan to selectively draw air though the heat exchanger during operation of an inverter cooling circuit coolant pump.

20 Claims, 4 Drawing Sheets

U.S. PATENT DOCUMENTS 6,664,751 B1 12/2003 Gabriel et al.
6,708,653 B2 3/2004 Lefrançois et al.
6,718,916 B2 4/2004 Hewkin
7,082,905 B2 8/2006 Fukuda et al.
7,096,683 B2 8/2006 Smith
7,147,038 B2 12/2006 Taguchi

OTHER PUBLICATIONS

Co-pending U.S. Appl. No. 11/520,461.
Co-pending U.S. Appl. No. 11/520,463.
Form 892 issued in co-pending U.S. Appl. No. 11/520,464.

* cited by examiner

COOLING SYSTEM FOR HYBRID POWER SYSTEM

BACKGROUND OF THE INVENTION

1. Field of the Invention

This invention relates to the field of power generating systems, and more specifically to a cooling system for a vehicular hybrid power system.

2. Description of the Prior Art

A typical vehicular hybrid power system utilizes both a battery stack and a generator engine unit to develop electrical power. The battery stack can typically be charged from either the generator engine unit or from shore power. The hybrid power system can be used, for example, to generate electrical power for a vehicle such as a recreational vehicle (RV). When utilizing such a hybrid power system onboard a vehicle, problems can arise with the need for cooling the hybrid power system components. Manufacturing costs, maintenance costs, and space requirements are only some of the factors that need to be optimized for such a system.

SUMMARY OF THE INVENTION

A vehicular hybrid power system generally includes an engine driven electrical power generator and a bank of batteries to provide a dual source of electrical power, and a power conversion assembly such as, but not limited to, an inverter for converting DC power to AC power. A cooling system according to one embodiment of the present invention provides an engine cooling circuit to deliver coolant to the generator engine, the engine cooling circuit including a radiator and a main fan to draw air through the radiator. One embodiment of the present invention also includes a cooling circuit to deliver coolant to the inverter, the inverter cooling circuit including a heat exchanger located such that the main fan also draws air through the heat exchanger when the main fan is active. The cooling system also includes a secondary fan to selectively draw air though the heat exchanger whenever a coolant pump is pumping coolant through the inverter cooling circuit.

DETAILED DESCRIPTION OF THE PREFERRED EMBODIMENTS

Figure 1:
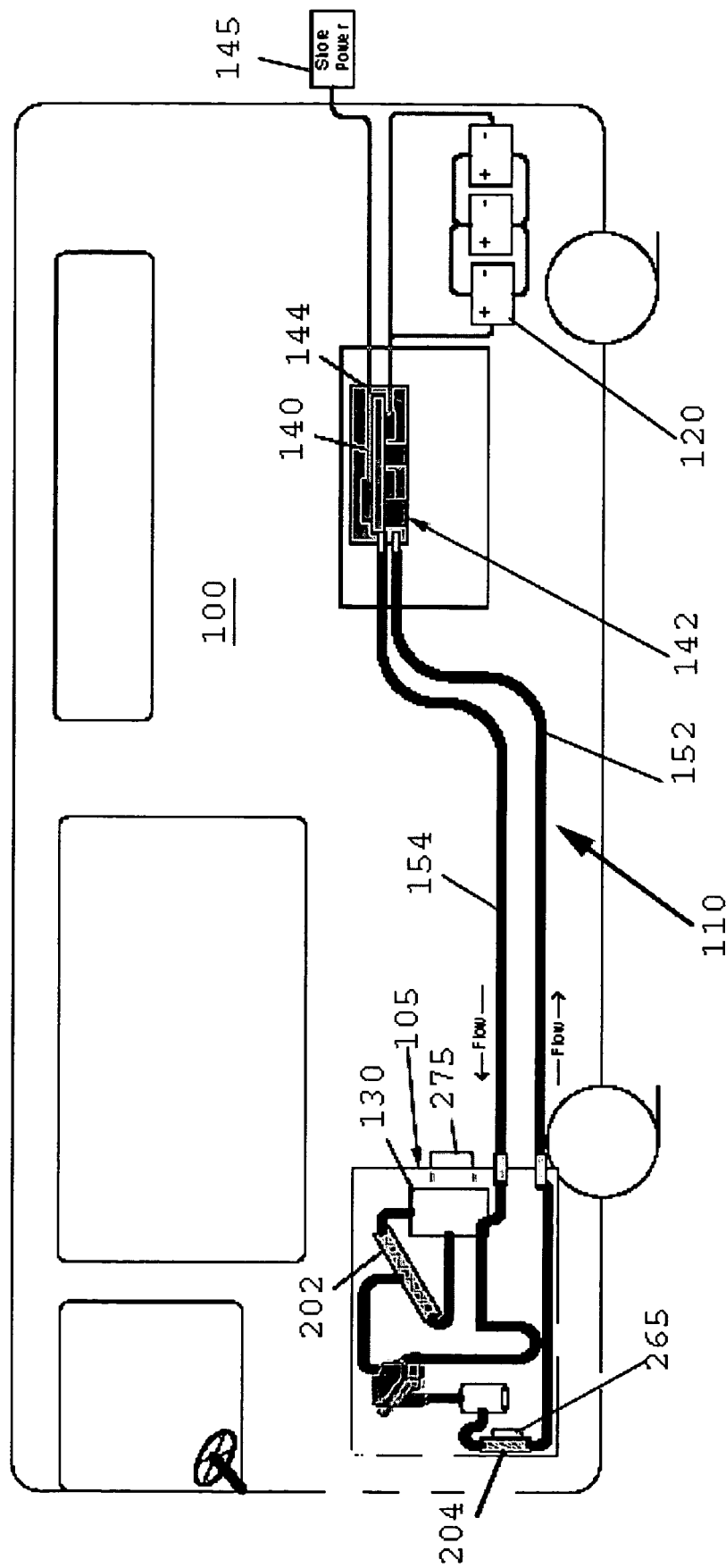
FIG. 1 is a schematic representation of a hybrid power system including a cooling system for the hybrid power system, in accordance with one embodiment.

FIG. 1 is a schematic representation of a hybrid power system including a cooling system 110 for the hybrid power system, in accordance with one embodiment. Cooling system 110 is shown embodied within in a recreational vehicle (RV) 100. Other embodiments can utilize cooling system 110 in other types of vehicles, such as, but not limited to, various types of aircraft or watercraft. A vehicular hybrid power generation system generally includes an electrical generator unit 105 including a generator engine 130, a battery bank 120, and a power conversion device such as, but not limited to, an inverter 140. The hybrid power system can also be seen to include an input for shore power 145. These components are operatively coupled to a controller 142 which manages the power requirements of RV 100.

In one embodiment, generator engine 130 can include a variable speed engine. Generator engine 130 receives fuel such as diesel, natural gas or liquid propane vapor through an intake. Generator engine 130 is coupled to an alternator such that as the crankshaft is rotated by the operation of generator engine 130, the crankshaft drives the alternator which, in turn, converts the mechanical energy generated by generator engine 130 to electrical power for transmission and distribution.

Cooling system 110 includes a radiator 202 operatively connected to generator engine 130 such that engine coolant from generator engine 130 circulates through radiator 202 during operation of generator engine 130. Air passes over the radiator 202 so as to effectuate a heat exchange between engine coolant flowing through radiator 202 and the air. In order to draw air over radiator 202, cooling system 110 can include a main fan 275 to draw air across radiator 202 so as to cool generator engine 130 and the engine coolant flowing through the radiator 202.

Battery bank 120 can include a desired number (i.e., six or more) 12V batteries located at a rear portion of the RV 100. These batteries deliver a nominal 12 V DC to inverter assembly 140 which converts the DC to AC power to help power the energy load required by RV 100, along with the energy of the electrical generator unit 105. The power from inverter assembly 140 and the generator unit 105 is managed by the energy management system controller 142 that helps store, manage, and deliver the energy load requirements of the RV 100.

A cooling system such as system 110 requires extensive cooling since the heat developed by inverter assembly 140 and generator engine 130 can be very high. In this embodiment, inverter assembly 140 is designed with a cooling plate 144. Cooling plate 144 receives coolant from the front portion of the RV via a coolant line such as a hose 152. Cooling plate 144 is incorporated into inverter assembly 140 and is adapted to provide enough cooling to allow the use of the inverter assembly 140 in the hybrid power system that includes cooling system 110. In this example, inverter assembly 140 for the hybrid power system is located near the battery bank 120, which traditionally in the rear portion of Class A coaches, such as RV 100, while the generator engine 130 has traditionally been located in the undercarriage slide-out at the front portion of the RV 100. Liquid coolant flows back to the inverter assembly 140 via hose 152 and back to a heat exchanger 204 via hose 154.

Figure 2:
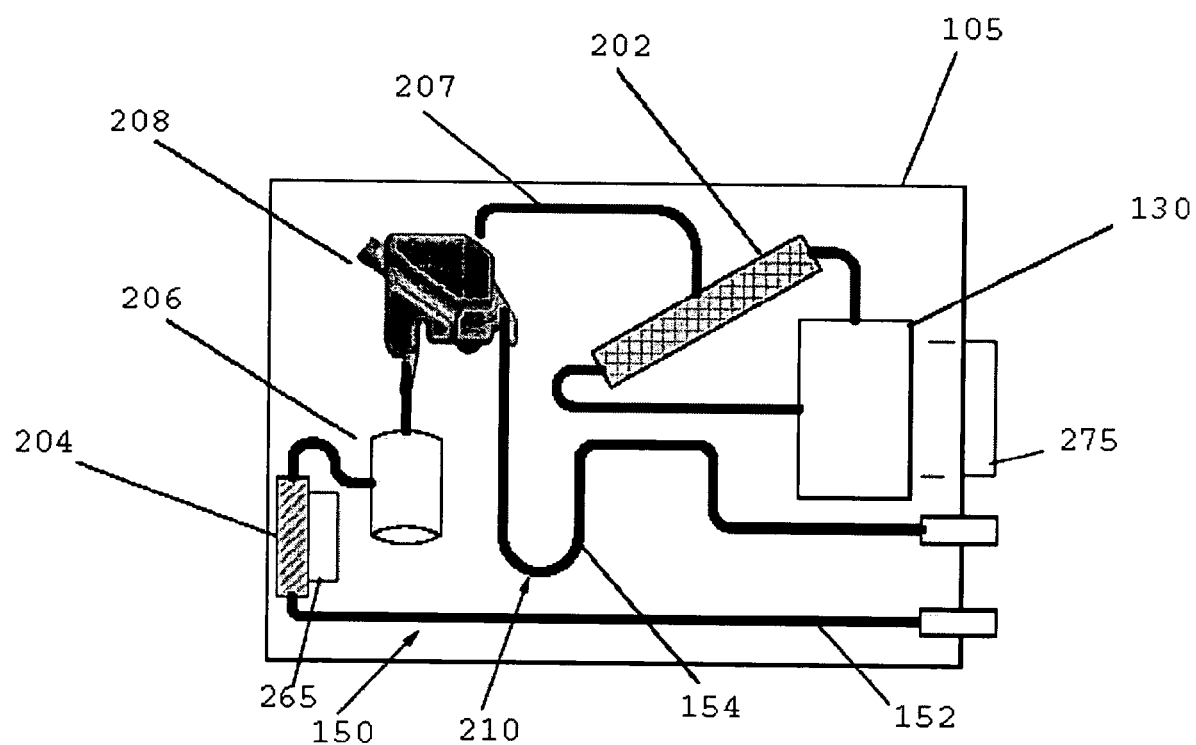
FIG. 2 is a schematic view of one portion of the cooling system for a hybrid power system shown in FIG. 1, in accordance with one embodiment.

Referring now to FIG. 2, which shows a schematic view of an electrical generator portion 150 of cooling system 110, generator portion 150 can be seen to utilize access to cooling air provided to engine radiator 202 by fan 275 along with a heat exchanger 204 and a pump 206, and transfers the cooling liquid using hoses 152 and 154 to and from inverter assembly 140 such as depicted in FIG. 1. Thus, when active, fan 275 draws air through the electrical generator compartment and through both radiator 202 and heat exchanger 204.

Coolant system portion 150 generally includes generator engine radiator 202, heat exchanger 204, a coolant pump 206, and a coolant tank 208. The cooling system 110 shown in FIG. 1 is designed such that the single coolant tank 208 is operatively coupled to both the generator engine 130 and the inverter assembly 140.

In one embodiment, for example, coolant flows in a first cooling circuit between generator engine 130 and generator engine radiator 202 with overflow being directed to coolant tank 208 via an overflow hose 207. In a second cooling circuit, coolant to the inverter assembly 140 flows from coolant tank 208 through coolant pump 206, through heat exchanger 204 back to the inverter assembly 140 via hose 152 and back to the coolant tank via hose 154 which is coupled to coolant tank 208. In one example, coolant tank 208 performs a dual purpose by acting as an engine coolant overflow for the generator engine cooling circuit and acting as an expansion and pressure head tank for the inverter cooling circuit. Other details of coolant system portion 150 are described in co-pending, co-assigned U.S. patent application Ser. No. 11/520,464 and co-pending, co-assigned U.S. patent application Ser. No. 11/520,461, which are incorporated herein by reference in their entirety.

As discussed, heat exchanger 204 receives coolant from the pump 206. In one embodiment, a secondary fan 265 can be used to provide further cooling of the coolant within heat exchanger 204. For example, fan 265 can include an electric fan controlled by controller 142 (or a separate controller) so as to draw air through the heat exchanger 204 when generator engine 130 is not running and fan 275 is not drawing any air through heat exchanger 204. These situations include when the power system 110 is running in battery mode or in shore power charge mode, for example. In these modes, the inverter assembly 140 gets hot, the inverter cooling circuit is used and the coolant running through the inverter cooling circuit needs to be cooled. When cooling system 110 is in a mode where generator engine 130 is running, the main engine cooling fan 275 draws air across heat exchanger 204. In this mode, fan 265 also runs as required, in coordination with coolant pump 206.

Controller 142 is programmed to control when and if the fan 265 and/or the cooling pump 206 need to be turned on and off. The controller 142 can include software and hardware that are programmed to provide the necessary functionality.

For instance, in one example, controller 142 can sense when it is unnecessary to cool the inverter assembly 140 and the controller 142 can turn the cooling pump 206 off. Thus, in one example, pump 206 may operate in any system mode based on factors such as temperature, current, or load thresholds. The thresholds can specify pump on/off conditions, incorporating hysteresis, for example. In some embodiments, minimum pump run times can be enforced, including a minimum run time after transitioning between states.

In one example, the controller 142 observes the temperature of the inverter assembly 140, pump operation status, battery voltage and pump current. Based on these qualifiers, the controller 142 will determine if the pump 206 is nonfunctional or if there is low/no coolant in the system. In other embodiments, if the controller 142 determines that the pump 206 is nonfunctional or there is no/low coolant in the system, then a fault will occur. The controller can also analyze the fan 265 speed and the fan 265 operational status. If the fan 265 speed is zero during commanded operation, the controller 142 will set a fault.

Figure 3:
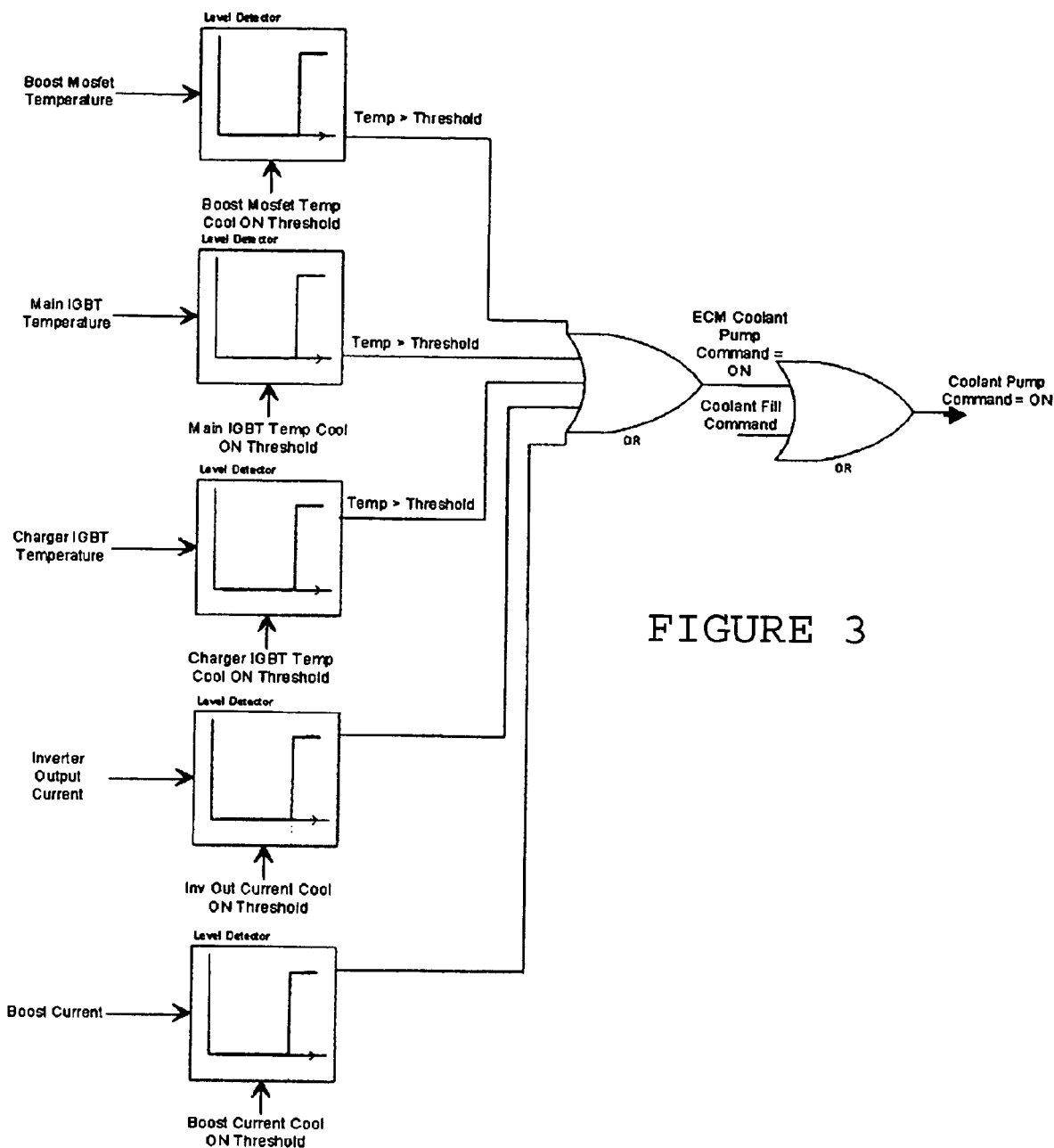
FIG. 3 is a schematic diagram illustrating a control logic suitable for controlling the hybrid power system cooling pump depicted in FIGS. 1 and 2.

FIG. 3 shows a schematic logic diagram for control of pump 206, in accordance with one embodiment. Here if any of boost Mosfet temperature, main IGBT temperature, charger IGBT temperature, boost current, or inverter output current go above a pre-determined temperature threshold, the coolant pump is turned on. Accordingly, the pump 206 will run whenever temperatures and currents in the inverter dictate necessary operation. In one example, the threshold values are: Charger IGBT: 50 degrees Celsius; Main IGBT: 65 degrees Celsius; Boost Mosfet: 60 degrees Celsius; Boost Current: 250 Amps; Inverter Output Current: 30 A. The Boost Mosfet, Main IGBT and Charger IGBT are included within inverter assembly 140.

The cooling system 110 can include temperature sensors located at these positions and at other components. The temperature signals are delivered to controller 142. The controller then will turn the fan 265 and pump 206 off or on as necessary.

Figure 5:
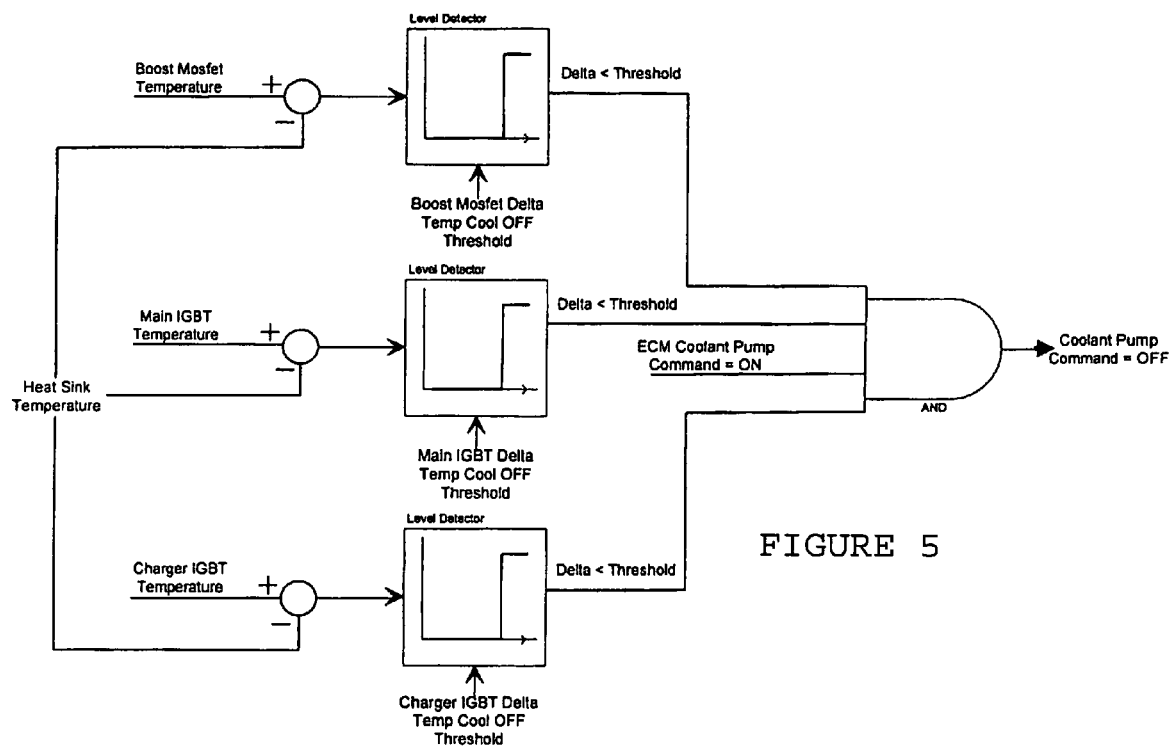
FIG. 5 is a schematic diagram illustrating another control logic suitable to control the hybrid power system cooling pump depicted in FIGS. 1 and 2.

FIG. 5 shows a schematic diagram showing the logic where the controller 142 turns off the pump if the pump is not required. In one embodiment, the controller uses the differences between the temperature points discussed above (charger IGBT, main IGBT, boost mosfet) and the cold plate 144. These temperature differences are called the deltas. Thus, if all of the deltas are below a threshold then the coolant pump is turned off. Thus, pump 206 will turn off whenever the inverter load is low enough to assure that the pump will not need to operate for a substantial period of time (for example, at least about 10 minutes). Generally, a 1 kW steady state inverter load (and often higher loads) produces component temperatures low enough such that the pump does not require operation. By looking at the temperature difference (delta) between the three inverter temperature sensors and the cold plate 144 depicted in FIG. 1, when the temperature difference (delta) has reached a minimum threshold value, it can be assumed the inverter assembly 140 load is low enough to turn off the pump 206. One embodiment uses the following deltas: Charger IGBT delta: 3 degrees C; Main IGBT delta: 5 degrees C; Boost mosfet delta: 5 degrees C.

Figure 4:
FIG. 4 is a schematic diagram illustrating control logic suitable to control the hybrid power system heat exchanger fan depicted in FIGS. 1 and 2.
Figure 6:
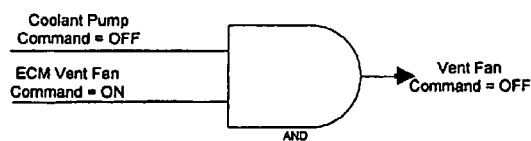
FIG. 6 is a schematic diagram illustrating a control logic suitable to control the hybrid power system heat exchanger fan depicted in FIGS. 1 and 2.

FIG. 4 shows a schematic logic diagram for operation of secondary fan 265 in accordance with one embodiment. For example, if the coolant pump command is ON, then the secondary fan 265 is turned on. FIG. 6 shows the logic to turn the secondary fan 265 off. If the coolant pump 206 is OFF and the secondary fan command is ON then the fan is turned OFF. In one example, the controller 142 can sense if the pump 206 and fan 265 are operating, as a diagnostic feature.

In one example, the cooling system 110 can sense whether or not there is coolant available to pump 206, and the controller 142 can be programmed such that if no coolant is available to the pump, the controls and logic provide a fault. For example, the controller 142 (or another controller) observes desired temperature levels within the cooling system 110, the pump 206 operation status, battery voltage and pump current. Based on these qualifiers, the controller 142 can determine the status of the pump or coolant in the system. Using typical pump operation as shown in the Table below, the fault logic can be set accordingly:

| Temp (C) | Volt (V) | Full Coolant System Current (A) | Empty Coolant System Current (A) |
|---|---|---|---|
| 75 | 14.5 | 3.75 | 1.93 |
| 75 | 10.45 | 2.53 | 1.76 |
| −20 | 14.5 | 4.03 | 2.41 |
| −20 | 10.5 | 3.00 | 2.31 |

The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A cooling system comprising:
   an engine;
   an engine cooling circuit to deliver coolant to the engine, the engine cooling circuit including a radiator and a main fan to draw air through the radiator of the engine cooling circuit;
   an inverter;
   an inverter cooling circuit to deliver coolant to the inverter, the inverter cooling circuit including a heat exchanger located such that the main fan draws air through the heat exchanger when the main fan is active;
   a secondary fan to selectively draw air through the heat exchanger of the inverter cooling circuit, and
   a controller configured to control operation of the secondary fan;
   the main fan and optionally the secondary fan being configured to draw cooling air across the heat exchanger of the inverter cooling circuit during modes when the engine is running, and the controller being configured to operate the secondary fan to selectively draw air through the heat exchanger of the inverter cooling circuit during modes when the engine is not running.

2. The cooling system according to claim 1, wherein the engine is adapted to develop electrical energy as part of a hybrid power system.

3. The cooling system according to claim 1, wherein the inverter is coupled to a bank of DC batteries.

4. The cooling system according to claim 1, wherein the engine cooling circuit and the inverter cooling circuit are coupled to a common coolant tank.

5. The cooling system according to claim 1, wherein the secondary fan is an electric fan.

6. The cooling system according to claim 1, wherein the controller turns the secondary fan on whenever a coolant pump to drive coolant through the inverter cooling circuit is active.

7. The cooling system according to claim 1, wherein the engine is a generator engine.

8. A cooling system comprising:
   an engine;
   an engine cooling circuit to deliver coolant to the engine, the engine cooling circuit including a radiator and a main fan to draw air through the radiator of the engine cooling circuit;
   an inverter;
   an inverter cooling circuit to deliver coolant to the inverter, the inverter cooling circuit including a coolant pump operatively coupled to a heat exchanger, the coolant pump to drive coolant though the inverter cooling circuit, the heat exchanger located such that the main fan draws air through the heat exchanger when the main fan is active;
   a secondary fan to selectively draw air through the heat exchanger of the inverter cooling circuit;
   a controller configured to control operation of the secondary fan;
   the main fan and optionally the secondary fan being configured to draw cooling air across the heat exchanger of the inverter cooling circuit during modes when the engine is running, and the controller being configured to operate the secondary fan to selectively draw air through the heat exchanger of the inverter cooling circuit during modes when the engine is not running, and
   the controller being configured to turn the secondary fan of the inverter cooling circuit on whenever the coolant pump is active.

9. The cooling system according to claim 8, wherein the engine is adapted to develop electrical energy as part of a hybrid power system.

10. The cooling system according to claim 8, wherein the inverter is coupled to a bank of DC batteries.

11. The cooling system according to claim 8, wherein the engine cooling circuit and the inverter cooling circuit are coupled to a common coolant tank.

12. The cooling system according to claim 8, wherein the secondary fan is an electric fan.

13. The cooling system according to claim 8, wherein the engine is a generator engine.

14. The cooling system according to claim 8, wherein the controller turns the pump on based on a predetermined threshold value of at least one of a temperature and current sensed at the inverter.

15. The cooling system according to claim 8, wherein the controller turns the pump on if any one of multiple temperature points or currents are above a pre-determined threshold.

16. The cooling system according to claim 14, wherein the predetermined threshold value includes any one of a temperature value of a boost Mosfet temperature, a main IGBT temperature, a charger IGBT temperature, and includes any one of a boost current and an inverter output current.

17. The cooling system according to claim 15, wherein the multiple temperature points include any one of a temperature of a boost Mosfet at 60 degrees Celsius; a temperature of a main IGBT at 65 degrees Celsius; a temperature of a charger IGBT at 50 degree Celsius and the multiple currents include any one of a boost current at 250 Amps and a inverter output current at 30 Amps.

18. The cooling system according to claim 8, wherein the controller turns the pump off if a difference between a temperature point of any one of a charger IGBT, a main IGBT, or a boost Mosfet and a temperature point of a cold plate are below a threshold value.

19. The cooling system according to claim 18, wherein the threshold value includes any one of 5 degrees Celsius difference between the temperature point of the boost Mosfet and the cold plate, 3 degrees Celsius difference between the temperature point of the charger IGBT and the cold plate, and 5 degrees Celsius difference between the temperature point of the main IGBT and the cold plate.

20. The cooling system according to claim 8, wherein the controller is configured to produce a fault signal when the controller determines no coolant is available to the pump based on temperature levels of the cooling system, pump operation status, battery voltage and pump current.

* * * * *